(12) United States Patent
Mandigo et al.

(10) Patent No.: US 9,085,471 B2
(45) Date of Patent: Jul. 21, 2015

(54) METHOD AND APPARATUS FOR RECYCLING WATER

(71) Applicant: AQUATECH INTERNATIONAL CORPORATION, Canonsburg, PA (US)

(72) Inventors: Gregory J. Mandigo, Crivitz, WI (US); Daniel P. Bjorklund, Waukesha, WI (US)

(73) Assignee: AQUATECH INTERNATIONAL CORPORATION, Canonsburg, PA (US)

( * ) Notice: Subject to any disclaimer, the term of this patent is extended or adjusted under 35 U.S.C. 154(b) by 0 days.

(21) Appl. No.: 14/370,843

(22) PCT Filed: Dec. 18, 2013

(86) PCT No.: PCT/US2013/075973
§ 371 (c)(1),
(2) Date: Jul. 7, 2014

(87) PCT Pub. No.: WO2014/100098
PCT Pub. Date: Jun. 26, 2014

(65) Prior Publication Data
US 2015/0000914 A1    Jan. 1, 2015

Related U.S. Application Data

(60) Provisional application No. 61/738,652, filed on Dec. 18, 2012.

(51) Int. Cl.
*F22D 7/00* (2006.01)
*C02F 1/06* (2006.01)
(Continued)

(52) U.S. Cl.
CPC ... *C02F 1/06* (2013.01); *C02F 1/04* (2013.01); *C02F 1/041* (2013.01); *E21B 43/24* (2013.01);
(Continued)

(58) Field of Classification Search
USPC ............... 166/303; 203/7, 11; 210/652, 664; 122/451 S, 40, 1 B
See application file for complete search history.

(56) References Cited

U.S. PATENT DOCUMENTS

| | | | | |
|---|---|---|---|---|
| 4,211,613 A | * | 7/1980 | Meckler | ........................ 203/11 |
| 4,441,958 A | * | 4/1984 | Teucci | ......................... 159/2.3 |

(Continued)

FOREIGN PATENT DOCUMENTS

| | | |
|---|---|---|
| CN | 201013340 Y | 1/2008 |
| JP | 2009250582 A | 10/2009 |

OTHER PUBLICATIONS

International Search Report and Written Opinion for PCT/US2013/075973, dated May 7, 2014.

*Primary Examiner* — Alissa Tompkins
*Assistant Examiner* — John Bargero
(74) *Attorney, Agent, or Firm* — Buchanan Ingersoll & Rooney PC

(57) ABSTRACT

We provide an evaporation based zero-liquid discharge method for generation of steam for enhanced oil recovery (EOR) processes utilizing once-through steam generators (OTSGs). The method includes feeding the OTSG(s) with produced water, vaporizing a fraction of this water for steam injection and blowing down the balance of the water. This water, referred to as OTSG blowdown, can be flashed to produce a vapor stream and a liquid that is fed to a mechanical vapor compression (MVC) evaporative process. The latent energy contained in the vapor stream generated by the upstream flash is beneficially recycled to substantially reduce or eliminate the energy consumption of the MVC process. The evaporative process can be used to reduce the liquid waste for disposal or eliminate the need for liquid disposal by achieving zero liquid discharge.

23 Claims, 11 Drawing Sheets

(51) Int. Cl.
*C02F 1/04* (2006.01)
*F22B 29/06* (2006.01)
*E21B 43/24* (2006.01)
*E21B 43/40* (2006.01)
*C02F 1/20* (2006.01)
*C02F 1/44* (2006.01)
*C02F 103/10* (2006.01)

(52) U.S. Cl.
CPC ............... *E21B 43/40* (2013.01); *F22B 29/06* (2013.01); *C02F 1/042* (2013.01); *C02F 1/20* (2013.01); *C02F 1/441* (2013.01); *C02F 2103/10* (2013.01); *C02F 2301/046* (2013.01); *C02F 2301/066* (2013.01); *C02F 2301/08* (2013.01); *C02F 2303/10* (2013.01)

(56) References Cited

U.S. PATENT DOCUMENTS

| | | | |
|---|---|---|---|
| 4,645,658 A * | 2/1987 | Gaddy et al. | 423/488 |
| 7,077,201 B2 | 7/2006 | Heins | |
| 7,963,338 B1 * | 6/2011 | Bader | 166/371 |
| 8,166,925 B2 | 5/2012 | Suggett et al. | |
| 2005/0056594 A1 * | 3/2005 | Nunez | 210/664 |
| 2010/0275600 A1 * | 11/2010 | Speirs et al. | 60/670 |
| 2010/0282593 A1 | 11/2010 | Speirs et al. | |
| 2012/0047941 A1 * | 3/2012 | James | 62/606 |
| 2012/0193093 A1 * | 8/2012 | James | 166/267 |

* cited by examiner

METHOD AND APPARATUS FOR RECYCLING WATER

CROSS-REFERENCE TO RELATED APPLICATIONS

This application claims priority to U.S. Provisional Patent Application No. 61/738,652, filed on Dec. 18, 2012. That application is incorporated by reference herein.

STATEMENT REGARDING FEDERALLY SPONSORED RESEARCH OR DEVELOPMENT

Not applicable.

BACKGROUND OF THE INVENTION

Several enhanced oil recovery ("EOR") methods have been demonstrated to have the ability to produce oil from reserves that would otherwise be inaccessible due to their depth below ground-level. Among these methods, thermal EOR techniques in particular have been proven to be effective for oil recovery; these processes often use once-through steam generators ("OTSGs") to produce the high pressure injection stream necessary for the process.

OTSGs typically produce a steam that is between 50% and 90% quality and, in some cases, requires the liquid phase from the vapor phase prior to injection to the reservoir. In such processes, the blowdown stream is often unfit for recycle due to elevated content of dissolved solids that have been concentrated between 2× and 10× in the steam generator. This OTSG blowdown stream is cooled, and a falling film evaporator is used to recycle a fraction of this water to the OTSG feed using mechanical vapor compression ("MVC") process. This technology is able to recover the water and reduce or eliminate the volumetric flow of waste water for disposal.

One disadvantage of the conventional method described above is the high specific energy consumption required for the MVC process. The operating costs associated with this amount of vapor compression are high and represent a prohibitive barrier to using such a process for water recovery. OTSG blowdown recovery processes commonly are only installed when there is a strong regulatory incentive, either in the form of water disposal limitation or make-up water restriction.

Another disadvantage of existing technology is that downstream evaporative zero liquid discharge (ZLD) technology typically also requires MVC design to complete the recovery/recycle of the OTSG blowdown stream. An MVC process for the ZLD evaporator represents an additional parasitic power consumption on the overall process and is a drawback to the process that could otherwise be used for complete water recycle and zero liquid discharge.

A further disadvantage to the conventional process is that the system requires a cooling system to reduce the temperature of the OTSG blowdown stream to near-boiling temperature (typically 90-98° C.) prior to being fed to the evaporator system. Historically, the OTSG blowdown is cooled by two or more heat exchangers arranged in series. The first cooling heat exchanger is conventionally designed to transfer heat to the steam generator feed water stream and is called the Boiler Feed Water ("BFW") Preheater. This is a positive use of energy since the BFW Preheater will reduce the utility heating requirement, often by another BFW Preheater which uses a hot glycol stream to finish the BFW preheating. The OTSG Blowdown temperature after being partially cooled by the BFW Preheater will have a temperature in excess of 140° C. and is further cooled by a Trim Cooler (with cooling glycol) to approximately 90° C. Refer to FIG. 9. The requirement of the extra heat exchanger(s) adds cost and additional space or footprint is also consumed.

BRIEF SUMMARY OF THE INVENTION

We provide a once-through flash evaporation technology. In our technology, the above disadvantages are overcome by substantially reducing or eliminating the MVC power consumption and reducing the overall cost and footprint by eliminating the need for upstream cooling before the evaporator. This is a significant benefit to the thermal EOR project and improves the overall economics of oil recovery both on a capital cost basis as well as on an operating cost basis.

DETAILED DESCRIPTION OF THE INVENTION

Figure 1:
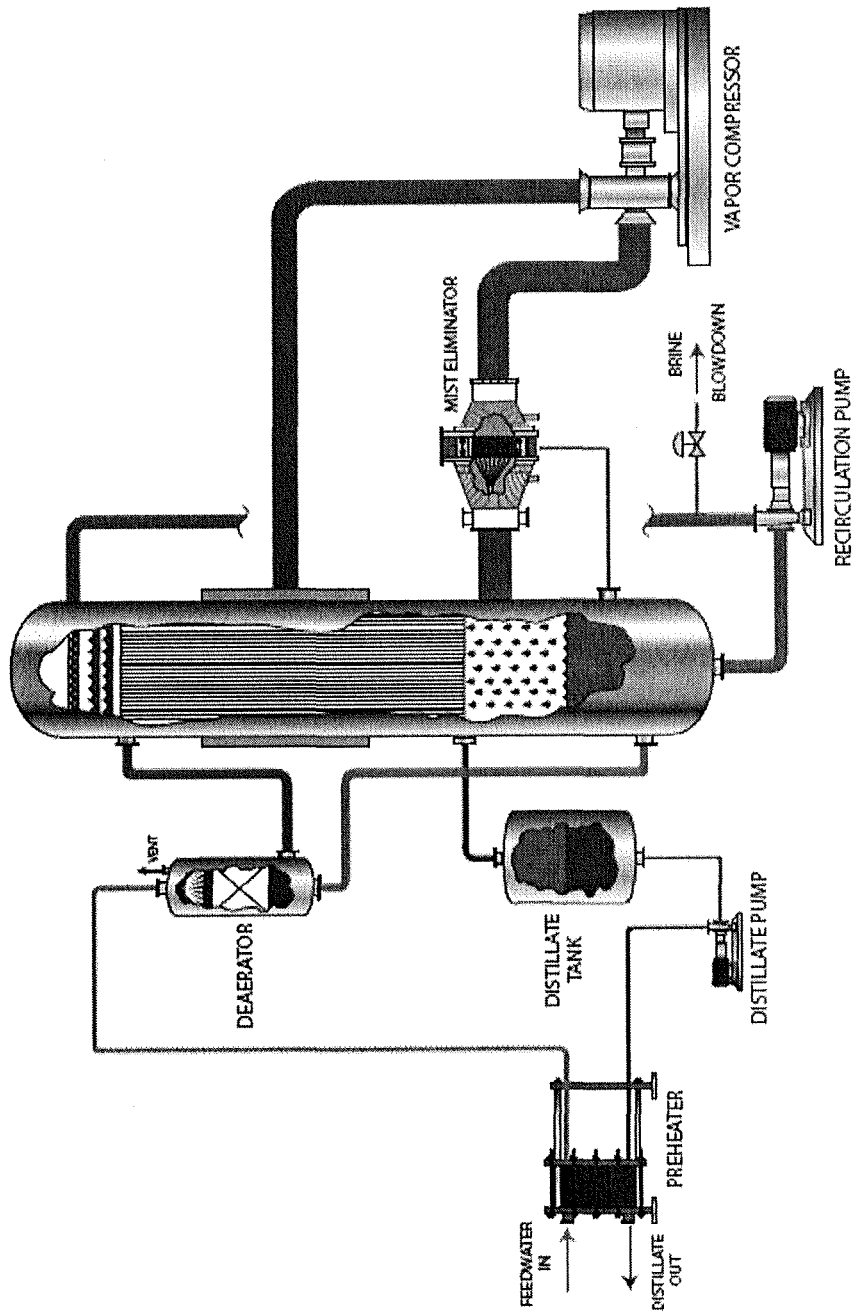
FIG. 1: Typical MVC evaporator utilized in the conventional method.
Figure 2:
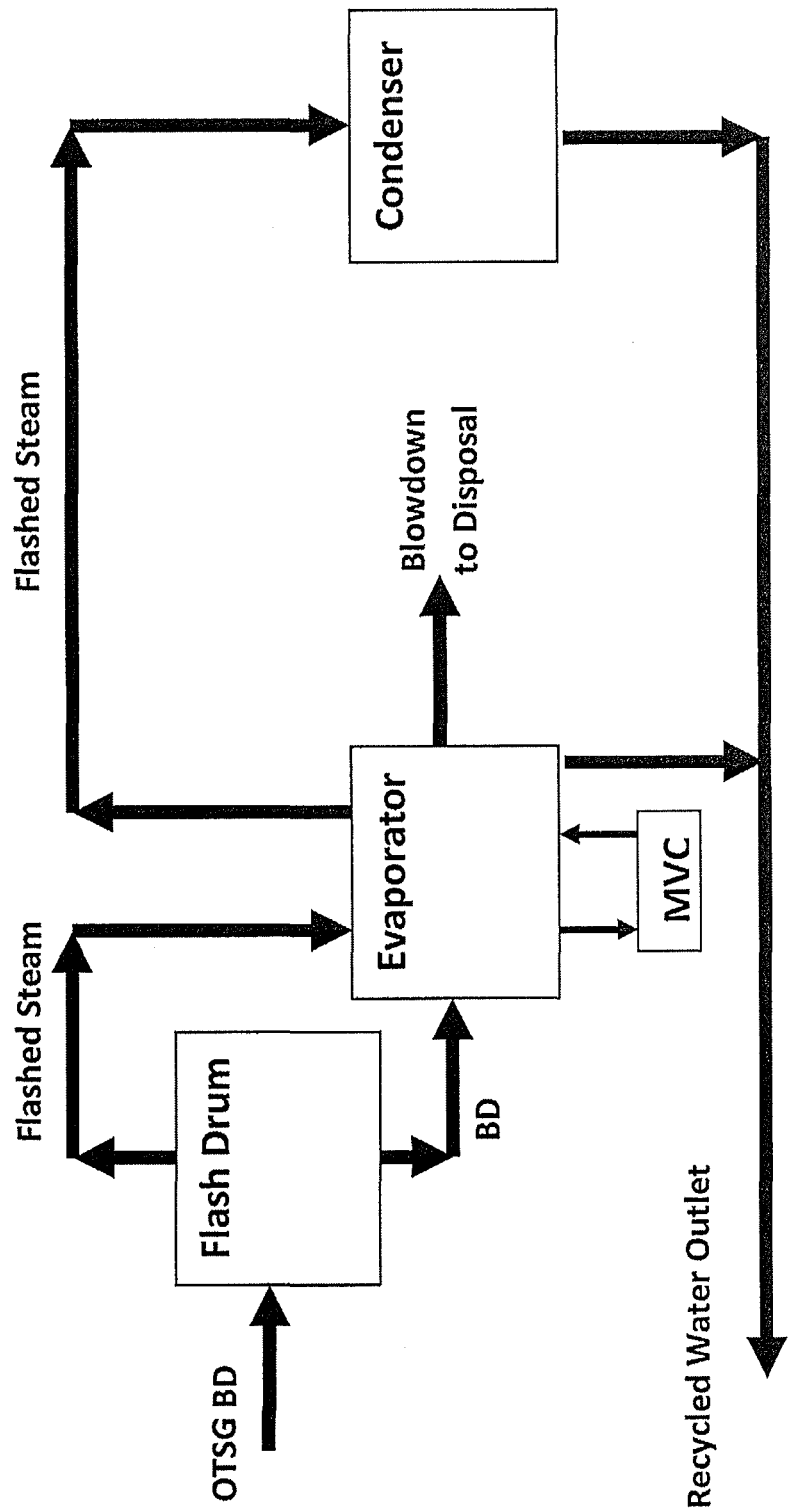
FIG. 2: OTSG blowdown recovery system utilizing invented Once-Through Evaporation technology. In this manifestation, flashed steam is used to drive partial evaporation (reducing MVC operating costs) and the excess flash steam can be condensed for additional water recovery.
Figure 3:
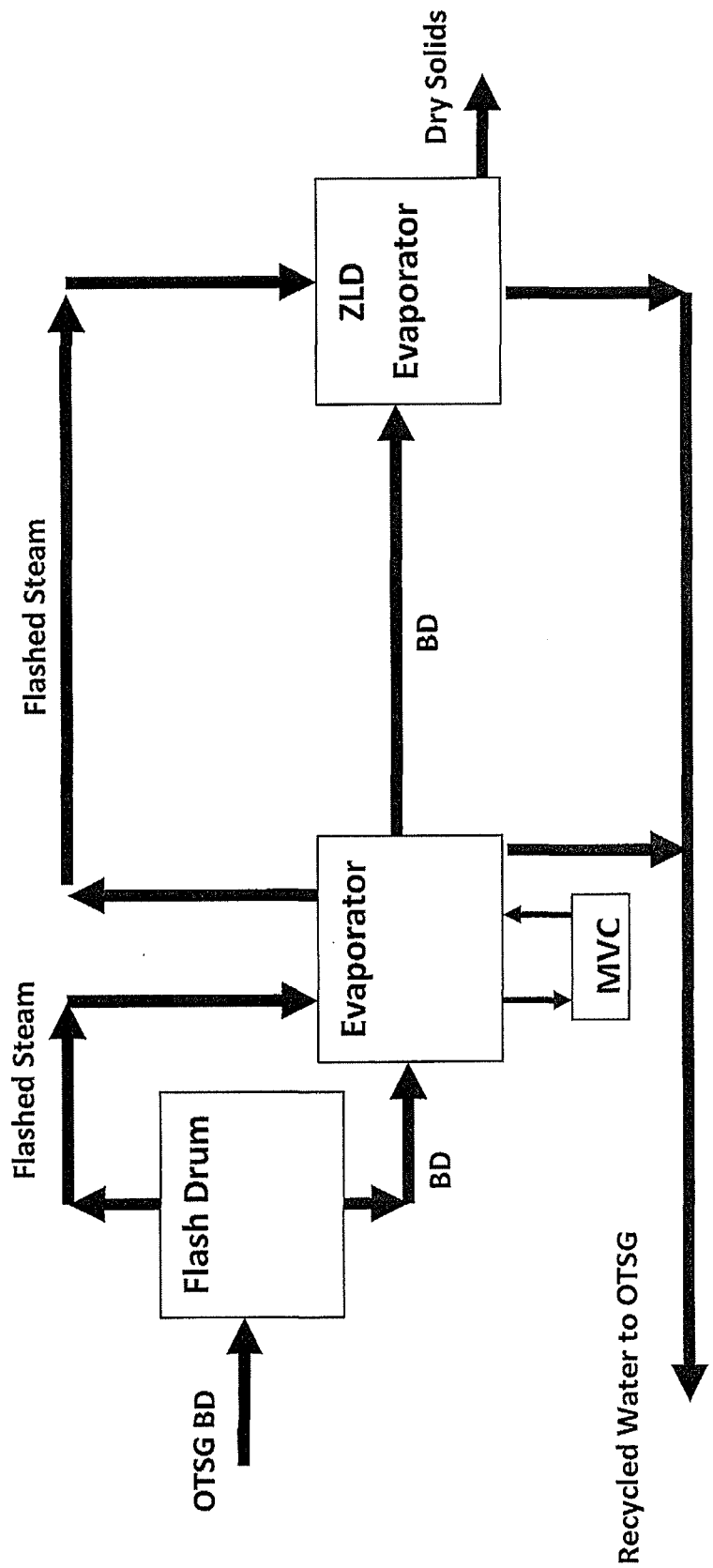
FIG. 3: OTSG blowdown recovery system utilizing Once-Through Flash Evaporation technology including ZLD treatment. In this example, flashed steam can be used for evaporation in the primary evaporator and in the ZLD evaporator.
Figure 4:
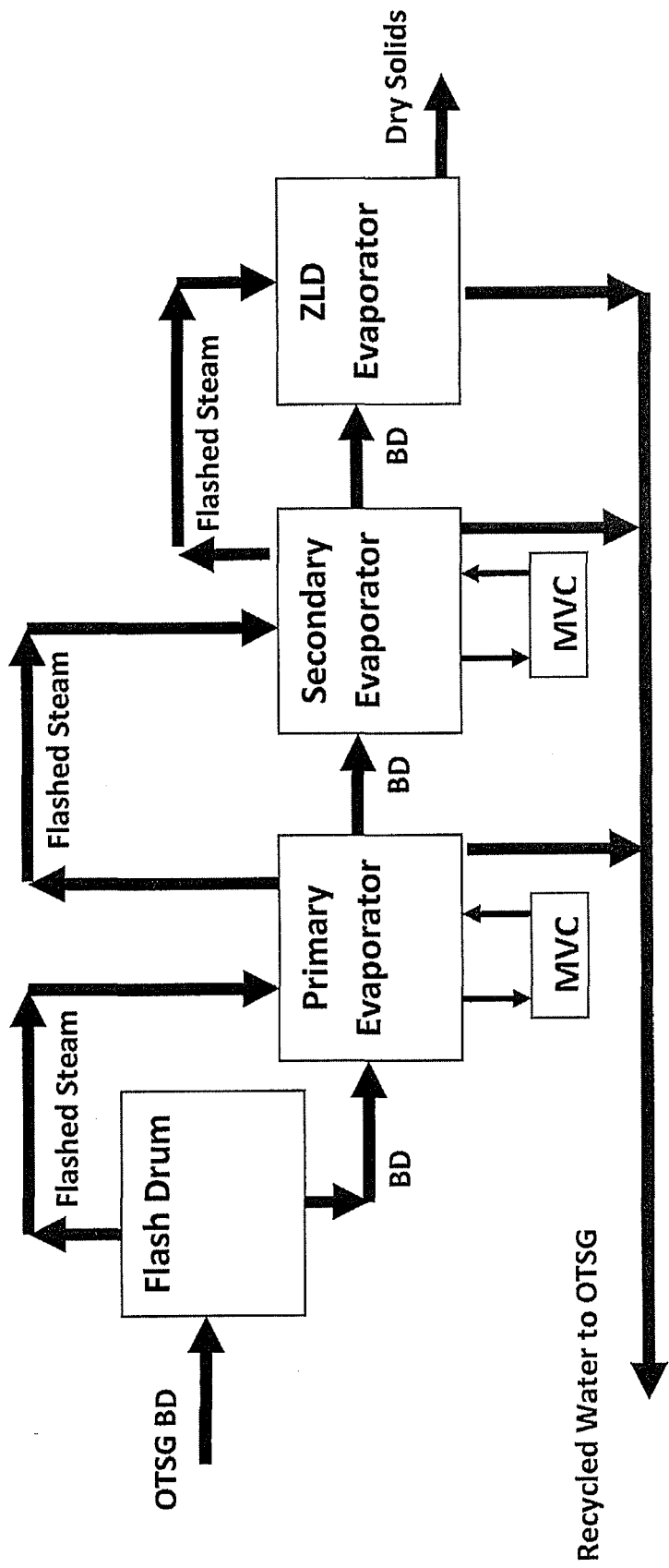
FIG. 4: OTSG blowdown recovery system utilizing Once-Through Flash Evaporation technology with ZLD. This example shows how the process could be utilized in a multiple evaporator arrangement.

We provide a Once-Through Flash Evaporation technology that substantially reduces or eliminates MVC power consumption and reduces the overall cost and footprint by eliminating the need for upstream cooling before the evaporator. This leads to a significant benefit to the thermal EOR project. It improves the overall economics of oil recovery both on a capital cost basis as well as on an operating cost basis.

We note that although embodiments of the invention are described in the context of produced water from steam-assisted gravity drainage projects for oil extraction, it may in fact be useful for any number of water purification systems. Unless the claims are so limited, though of skill in the art will understand and appreciate the general applicability of the method for a variety of industries.

In our thermal EOR process, steam is injected into an oil producing reservoir to enhance the recovery of oil from the resource. A produced stream returns to the surface as an emulsion of oil, water, and gas. Some fraction of the injected fluid (steam) is retained in the reservoir and does not return to the surface. This requires that make-up water be added to system to maintain the overall water balance. The amount of make-up water used is also affected by the flow rate of disposal water discharged from the process.

Disposal water stream is typically taken as a fraction of the OTSG blowdown stream, whereby a fraction of the OTSG blowdown stream is recycled back to the steam generator and the remaining fraction is discharged for disposal. This disposal rate requirement is typically dictated by the dissolved solids content of the produced water stream; steam generators typically limit the dissolved solids content of the BFW to less than 8,000 ppm. In such a process where the discharge disposal rate is determined based on solids purge requirement, an evaporator can effectively be used to concentrate the dissolved solids content to recover a large portion of the water and reduce the discharge flow requirement.

This evaporator can be fed with any number of discrete or blended streams in the process. The evaporator is essentially used to produce a dissolved solids purge from the plant. For example, the evaporator can be fed with OTSG blowdown, make-up water, deoiled produced water or any blend of these streams. The Once-Through Flash Evaporation technology can be applied to any evaporator placement configuration (in other words, any combination of evaporator feed waters) and the optimal solution is determined on a case-by-case basis for individual projects.

As described in the background section, evaporative processes require an energy source to drive vaporization forward. In the oil and gas industry, this source is typically electrical and is added to the evaporator via a process called mechanical vapor compression (MVC). MVC technology is based on recycling the latent heat of vaporization of the evaporated water by compressing the vapor stream and condensing the vapor at a higher pressure on the heat transfer tubes. The majority of the electrical power required for the MVC process is added through the vapor compressor and, to a lesser extent, the centrifugal process pumps.

Figure 9:
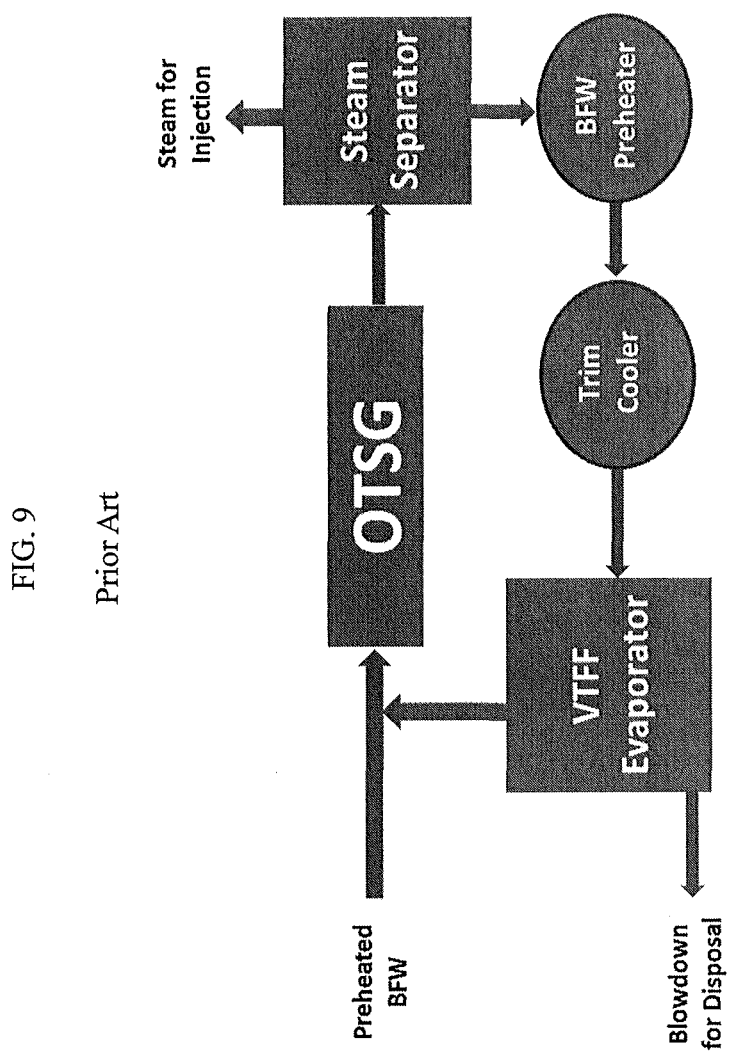
FIG. 9: OTSG Blowdown recovery system utilizing the conventional MVC evaporator technology. This figure specifically shows the typical processing steps required upstream of the conventional evaporator systems. This includes BFW Preheater and Trim Cooler upstream of the conventional evaporator.

One significant aspect to the Once-Through Flash Evaporator technology is that feed waters to the evaporator system in EOR applications are already existing at elevated pressures and temperatures as they are discharged from the OTSG. For example, it is common for OTSG's to discharge a vapor/liquid mixture at pressures between 1,000 psig (545° F.) and 2,500 psig (668° F.) This mixture is then sent through one or multiple steam separators that separate the vapor and water phases. The water phase that leaves the separator would then flow through a BFW preheater that cools the blowdown water stream by recovering energy by transferring to the BFW stream. Typical processes then have an additional cooling heat exchanger that further cools the blowdown stream and trims the temperature to a setpoint lower than atmospheric boiling point, approximately 90° C. See FIG. 9 for this process.

Since evaporation is a thermal process, it is possible to beneficially use thermal energy in any form to enhance the overall efficiency of the evaporation. If thermal energy is available in the form of steam, for example, the steam can be sent directly to the evaporator shell to directly cause evaporation. The amount of evaporation that is performed by the beneficial thermal energy stream will proportionally decrease the work performed by the vapor compressor. As the work of compression is reduced, the power consumption and operating expense ("OPEX") will correspondingly be reduced.

Figure 10:
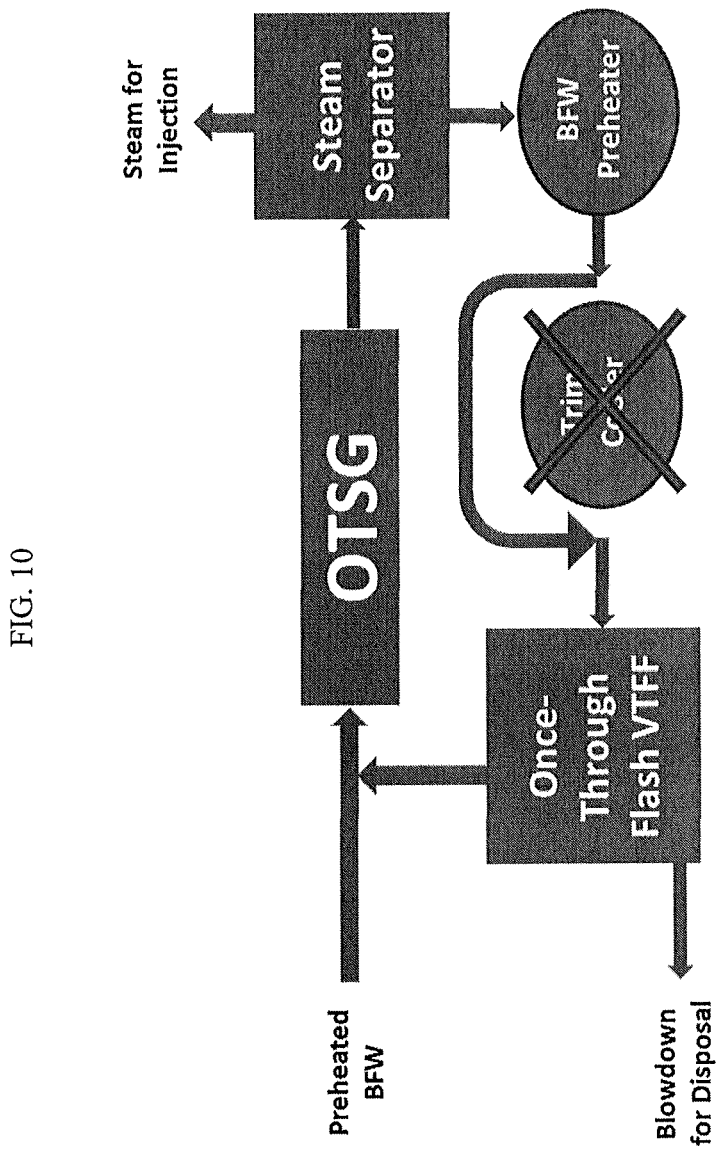
FIG. 10: OTSG Blowdown recovery system utilizing the invented Once-Through Flash Evaporation technology. This figure specifically shows the reduction in processing steps required upstream of the invented evaporator systems. In this embodiment, a BFW Preheater is utilized for heat recover but the Trim Cooler is not required since the Once-Through Flash Evaporator is designed to accept the feed water temperature at high temperature.
Figure 11:
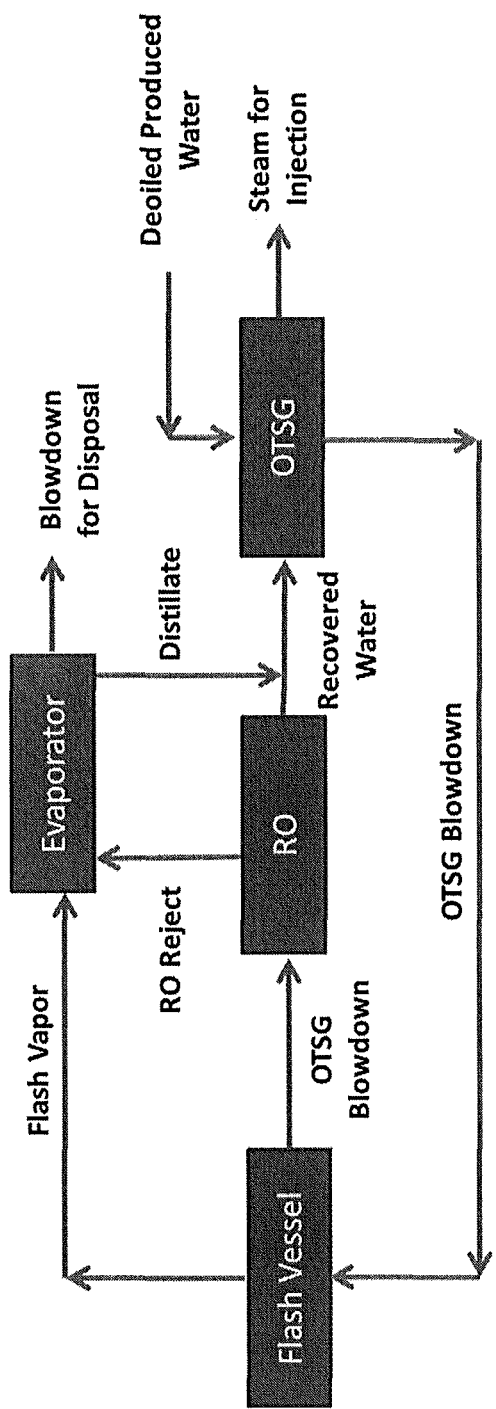
FIG. 11: OTSG Blowdown recovery system utilizing the invented Once-Through Flash Evaporator technology and incorporating reverse osmosis for preconcentration of the OTSG blowdown stream prior to the evaporator.

Our Once-Through Flash Evaporator design takes advantage of this principle by generating a useable thermal energy from the feed water. This useable energy is produced in a flash chamber upstream of an evaporator that is designed to convert sensible heat into an useable latent heat. The flash chamber is pressure-controlled such that as the hot feed water enters the vessel, vapor is generated and released directly to the evaporator shell for evaporation. The feedwater flashes because the influent vapor pressure is greater than the pressure setpoint of the flash chamber. A useable thermal energy stream has been created. Refer to FIG. 10 to show an embodiment of this process.

In our evaporator design, the feed water stream does not need to be cooled to 90° C. and, in fact, actually omits the final trim cooling step. In some embodiments the final trim cooling step is not performed since the influent temperature can exist at >120° C., which is the natural stream temperature exiting the BFW preheater. Alternatively, the influent temperature can exist at >200° C., which is the natural temperature exiting the steam generator which can eliminate even the BFW preheater step. This allows for a capital expenditure ("CAPEX") improvement by eliminating the glycol-cooled heat exchangers.

One embodiment of the invention may include, for example, the following steps for recovery of water from a once-through steam generator blowdown water for heavy oil production:
  a) providing produced water stream extracted from a heavy oil production well;
  b) deoiling the produced water stream to provide a deoiled water stream;
  c) feeding the deoiled water stream to the once-through steam generator as feed water (OTSG Feed);
  d) injecting steam produced by the once-through steam generator into a heavy oil injection well;
  e) blowing down a fraction of the OTSG feed water (called OTSG BD) to a flash evaporation process;
  f) flashing a fraction of the OTSG BD stream to produce a vapor phase and a liquid phase;
  g) flowing the said vapor phase to the evaporator where the vapor transfers latent heat to the evaporator and condenses to form condensate;

h) feeding the said liquid phase to the evaporator where a fraction of the OTSG BD is evaporated which causes the remaining OTSG BD liquid phase to be more highly concentrated;

i) blowing down the concentrated OTSG BD from the evaporator (called evaporator blowdown) for disposal; and j) recovered water is recycled to the process upstream of the OTSG, either to the produced water or deoiled water.

Of course, additional water treatment step(s) may be performed on the deoiled water to make the water more suitable for use in an OTSG. These may include, for example, but are not limited to, hardness reduction, silica reduction and/or alkalinity reduction. This may be accomplished, for example, with various precipitation or softening technologies. These may include a) warm lime softening, b) hot lime softening, and c) cold lime softening, d) ion exchange, e) caustic softening, f) magnesium oxide dosing.

The water treatment step(s) may also include reduction of dissolved solids. This may be done, for example, with processes that may include membrane separation and/or evaporation.

In some embodiments the OTSG BD may be partially cooled prior to flowing to the flash evaporation system. In some embodiments the remaining liquid phase of the OTSG blowdown stream is processed through one or more additional preconditioning steps upstream of the evaporator.

The deoiled water stream may be supplemented as necessary. For example, it may be supplemented by addition of at least one member of the group consisting of make-up water, wastewater, and/or a partial recycle of OTSG blowdown.

The preconditioning step may also include one or more of hardness reduction, alkalinity reduction, and silica reduction. In some embodiments the preconditioning includes ion exchange for polishing or hardness removal that achieves a hardness reduction to less than 0.5 mg/L.

In some embodiments of the invention chemicals are added to the water treatment system. These may include, for example, acids, bases, or other chemicals such as magnesium oxide, lime, and soda ash. This addition can be upstream of the evaporator, downstream of the evaporator, or to the evaporator itself. Addition to the evaporator itself might include addition to the evaporator body, the sump, and/or associated piping and equipment.

In some embodiments a deaerator is included in the process. This may be useful, for example, for removal of alkalinity, dissolved gases or other volatile components. Deaeration can be beneficially applied upstream of the OTSG or upstream of the Once-Through Flash Evaporator.

Some embodiments of the invention use a single evaporator. Other embodiments use multiple evaporators. Evaporator type can be many designs that facilitate heat exchange through use of a plurality of heat exchange surfaces. Said heat exchange surfaces can be tubular and/or plate, among other types of geometries. Where there are multiple evaporators they are typically arranged in a multiple-effect configuration. In such a configuration the vapor generated by one effect is used to drive evaporation in a subsequent effect. In some multiple effect evaporators the flash steam is sufficient to drive 100% of the evaporation required in the evaporator effects. MVC is not required in those embodiments. In another embodiment the vapor phase of the OTSG blowdown is sent to one or more of the evaporators to drive evaporation.

The evaporator blowdown is typically disposed of. For example, it may be disposed of by deep-well injection. Another example is by injection into a salt cavern. In some embodiments the evaporator blowdown is mechanically and/or chemically conditioned prior to disposal. This can include the use of acid addition for neutralization and silica precipitation, magnesium oxide addition for silica precipitation, and mechanical conditioning methods such as clarification or agitation.

In some embodiments the evaporator blowdown is further processed to achieve zero liquid discharge, or "ZLD." This processing may be, for example, by processing in another evaporator and/or in a crystallizer. In some embodiments the evaporator blowdown is processed in another evaporator or crystallizer to achieve zero-liquid-discharge or reduced liquid-discharge.

In further embodiments a fraction of the vaporized water from the evaporator is condensed in a vapor condenser to produce a condensed liquid that can also be recycled upstream of the OTSG. In some embodiments the condensate streams of the condenser and evaporator are recovered and recycled upstream of the OTSG.

In some embodiments the vapor phase generated by the upstream flash is used as motive steam to a thermocompressor to efficiently entrain lower pressure water vapor for beneficial use. In some instances this beneficial use is to drive evaporation by flowing the thermocompressor discharge water vapor to an evaporator to recycle the latent heat by driving further evaporation.

In some embodiments the liquid phase leaving the flash vessel is concentrated by a reverse osmosis membrane. This reverse osmosis membrane creates a reverse osmosis reject stream, which typically is suitable for deep-well disposal. The reverse osmosis reject stream may be further concentrated by an evaporator. It may also be processed in a ZLD system.

Embodiments of the invention may be further understood with reference to the figures and the examples. Consider an embodiment of this technology in which the evaporation system includes a 1) flash drum; 2) primary evaporator; 3) secondary evaporator; and 4) vapor condenser. (Refer to FIG. 5)

Figure 5:
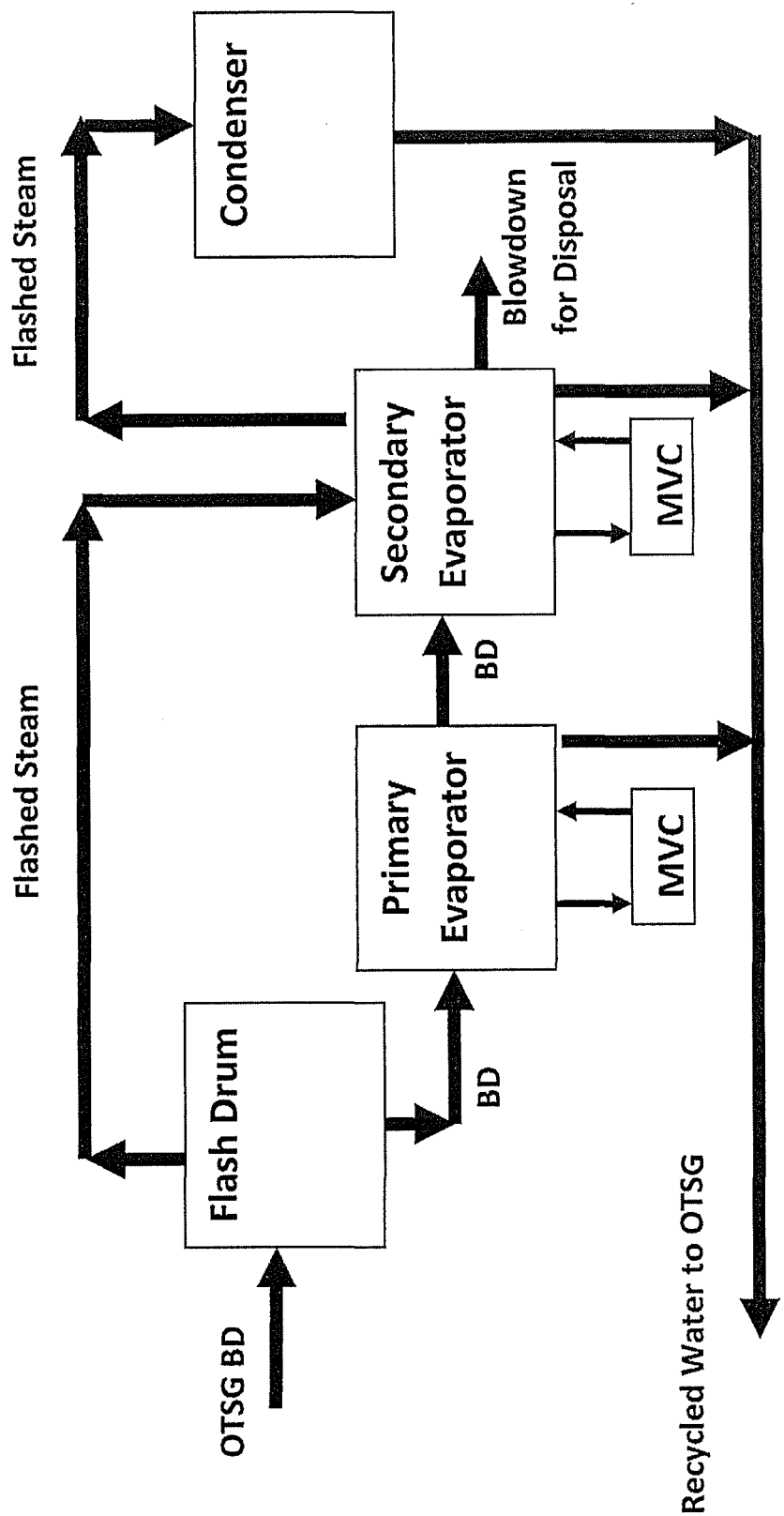
FIG. 5: OTSG blowdown recovery system utilizing Once-Through Flash Evaporation technology with two evaporators in series and a vapor condenser.

In embodiments as shown in FIG. 5, the OTSG blowdown stream to the evaporator system is accepted without substantial upstream cooling. The OTSG blowdown is fed to the evaporator system existing at a high specific enthalpy, having a temperature and pressure equal to (or less than) that of the injection steam. Before being fed to the primary evaporator vessel itself, this high enthalpy stream can be flashed to near atmospheric pressure (or lower) to generate a vapor phase and a liquid phase. The liquid stream is separated and is fed to the primary evaporator vessel for evaporation and water recovery.

The evaporator system may include two or more evaporators arranged in a series configuration such that the liquid feed is first sent to Evaporator #1 and the concentrated blowdown is sent to Evaporator #2 for further concentration. In such a configuration the power consumption of the MVC is a strong function of the boiling point elevation and dissolved solids content of the liquid being evaporated. Therefore the specific power consumption of Evaporator #2 will be greater than that of Evaporator #1. The energy economy of an MVC evaporator is graded in terms of kW per cubic meter of distillate produced. In one example, Evaporator #1 has an energy economy of 12 kW/m$^3$ and Evaporator #2 has an energy economy of 15 kW/m$^3$.

In embodiments of the invention we recycle the latent heat content of the steam (generated in the flash drum upstream of Evaporator #1, by sending this steam to the shell-side of Evaporator #2. The steam causes evaporation to occur in Evaporator #2 in a ratio of approximately 1 kg evaporation for 1 kg of steam sent to the shell-side. In so doing, the process realizes a two-fold benefit.

1) The water that is vaporized in the flash drum does not need to be evaporated in the downstream evaporators and, more specifically, does not require compression with a mechanical vapor compressor.

2) The water vapor generated by the flash vessel can be used to drive evaporation in a subsequent evaporator (Evaporator #2 in this example). This further reduces the amount of flow that requires compression with the mechanical vapor compressor. This vapor can be recovered by condensation without compression.

In this example, utilizing two evaporators in series, it is recognized that recycling the latent heat of vaporization of the upstream flashed steam in Evaporator #2 has a greater energy savings compared to recycling this latent heat in Evaporator #1 since the MVC #2 specific power consumption is greater than that of MVC #1.

In a further embodiment of the invention the OTSG blowdown exists at a temperature of about 137° C. and is fed to the Once-Through Flash Evaporation system. The stream flashes down to a temperature of approximately 105° C., and approximately 10% of the OTSG blowdown is converted to vapor phase. The remaining 90% of the stream exists as liquid phase and is fed to an evaporator system consisting of two MVC evaporators arranged in series, such that the blowdown from evaporator #1 is fed to evaporator #2. The blowdown from evaporator #2 exits the evaporator system for disposal.

In this example the OTSG blowdown stream is initially at 120 m³/h and the evaporator system is designed for 6 cycles of concentration such that the final blowdown stream is 20 m³/h. This leaves a total of 100 m³/h that must be recovered as distillate/condensate.

Of the initial 100 m³/h that must be recovered, 12 m³/h has already been released in the evaporator flash vessel. This leaves only 88 m³/h left to recover. In this example, 50 m³/h is evaporated in Evaporator #1 and 38 m³/h in Evaporator #2. The remaining 12 m³/h of recovered water is produced by the vapor condenser bringing the total to 100 m³/h of recovery.

Since 12 m³/h (Cold Water Equivalent) of steam is sent to Evaporator #2 to drive evaporation, and since steam-driven evaporation has an efficiency of approximately 1 kg steam for 1 kg evaporation (since each stream has approximately the same latent heat of vaporization), one may conclude that the total amount of water vapor requiring compression in the mechanical vapor compressor is 38 m³/h less 12 m³/h=26 m³/h.

The energy requirement for the process is calculated as follows:

Evaporator #1 is 50 m³/h*12 kW/m³=600 kW

Evaporator #2 is 26 m³/h*15 kW/m³=390 kW

Total Power Consumption=990 kW

This may be compared to a typical OTSG blowdown treatment system. In a conventional design, the OTSG blowdown is cooled to 98° C. by a process cooler. (Note that this process cooler was not required in the invented technology.) The full 120 m³/h OTSG blowdown is fed to an evaporator system consisting of two MVC evaporators arranged in series, somewhat similar to the case described previously. Let us assume equivalent specific power consumptions for each MVC evaporator. In this case, 50 m³/h of water is recovered in each evaporator to produce a final blowdown stream of 20 m³/h.

The energy requirement for the process is calculated as follows:

Evaporator #1 is 50 m³/h*12 kW/m³=600 kW

Evaporator #2 is 50 m³/h*15 kW/m³=750 kW

Total Power Consumption=1,350 kW

To quantify these results of this example, the invented technology consumes 360 kW less power than the conventional technology or 26.6% less power.

Example #2

Figure 6:
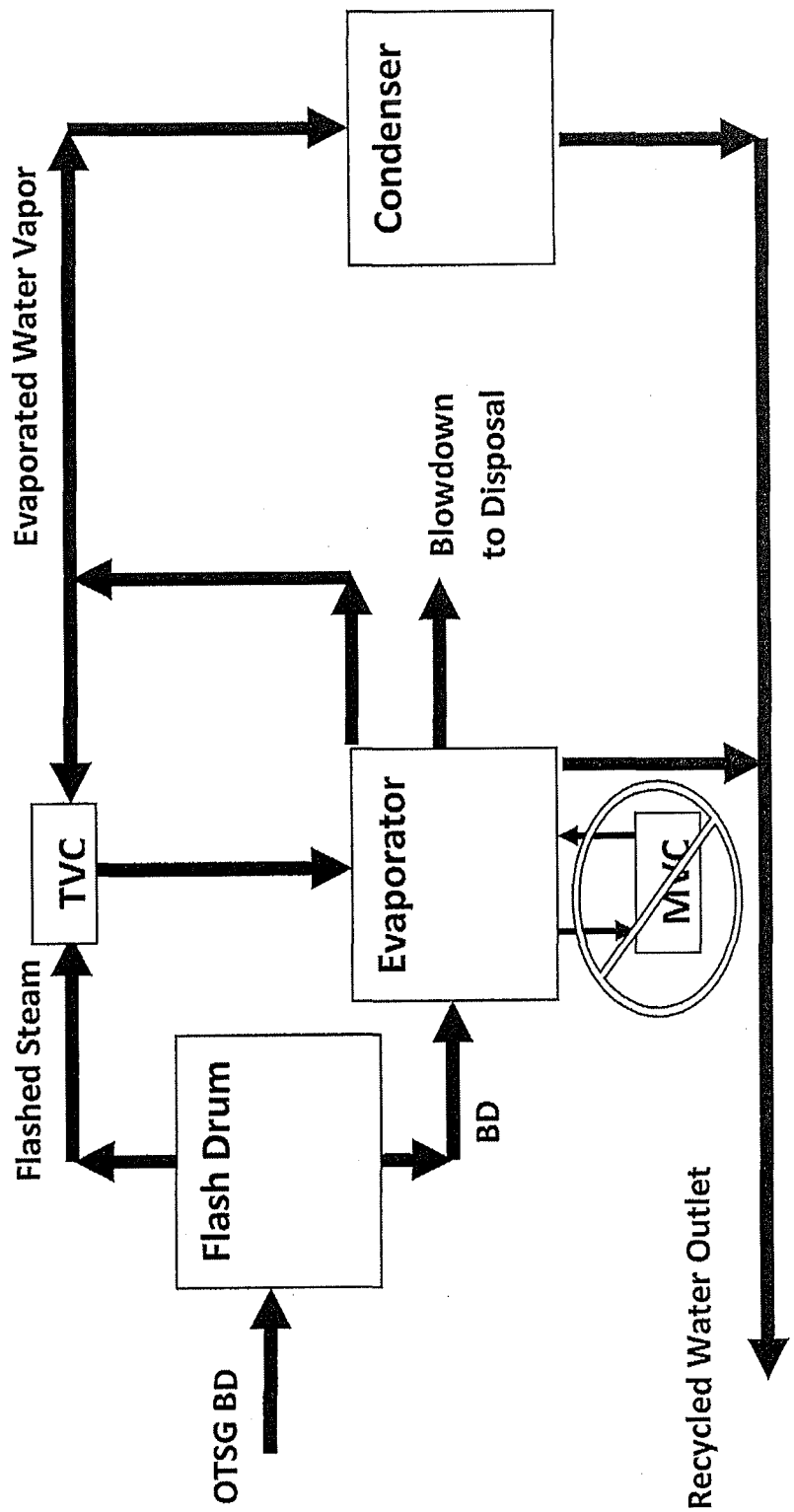
FIG. 6: OTSG blowdown recovery system utilizing Once-Through Flash Evaporation technology with a thermocompressor and evaporator and vapor condenser.

In another embodiment the evaporation system includes a 1) flash drum; 2) thermocompressor; 3) primary evaporator; and 4) vapor condenser. (Refer to FIG. 6.)

In this embodiment the OTSG blowdown stream is accepted to the evaporator system without substantial upstream cooling. The OTSG blowdown is fed to the evaporator system existing at a high specific enthalpy, having a temperature and pressure equal to (or less than) that of the injection steam. Before being fed to the evaporator vessel itself, this high enthalpy stream can be flashed to a medium pressure to generate a vapor phase and a liquid phase.

The vapor phase, existing at a medium pressure, can be used as motive steam in a thermocompressor. The thermocompressor will use this high energy motive stream to load vapor being generated by the evaporator to produce a discharge water vapor stream that is suitable to drive evaporation and eliminate the need for a mechanical vapor compression.

Assume that the OTSG BD stream has an initial flow rate of 100 ton/h and that the evaporator treatment process is required to reduce the stream to 40 ton/h for disposal. This requires that 60 ton/h of water be recovered.

The 100 ton/h OTSG BD stream flows to a flash vessel that operates at a pressure such that 20 ton/h of liquid is flashed into a medium pressure vapor stream that flows to a thermocompressor. The remaining 80 m³/h of liquid phase exits the flash vessel and flow to the evaporator system as feed water. From the 80 ton/h of feed water, the evaporator system produces 40 ton/h of water vapor and blowsdown 40 ton/h for disposal.

Of the 40 ton/h of water vapor generated in the evaporator, 20 ton/h of this will be entrained or loaded in the thermocompressor. The thermocompressor then discharges 40 ton/h of water vapor which is at a pressure suitable to drive 100% of the necessary evaporation in the evaporator. The remaining 20 ton/h of water vapor produced by the evaporator that is not loaded into the thermocompressor will flow to a vapor condenser for recovery.

This example demonstrates one embodiment of the invention in which the flash process eliminates the need for mechanical vapor compression by using the flashed water vapor to drive a thermocompression evaporation process.

Example #3

Figure 8:
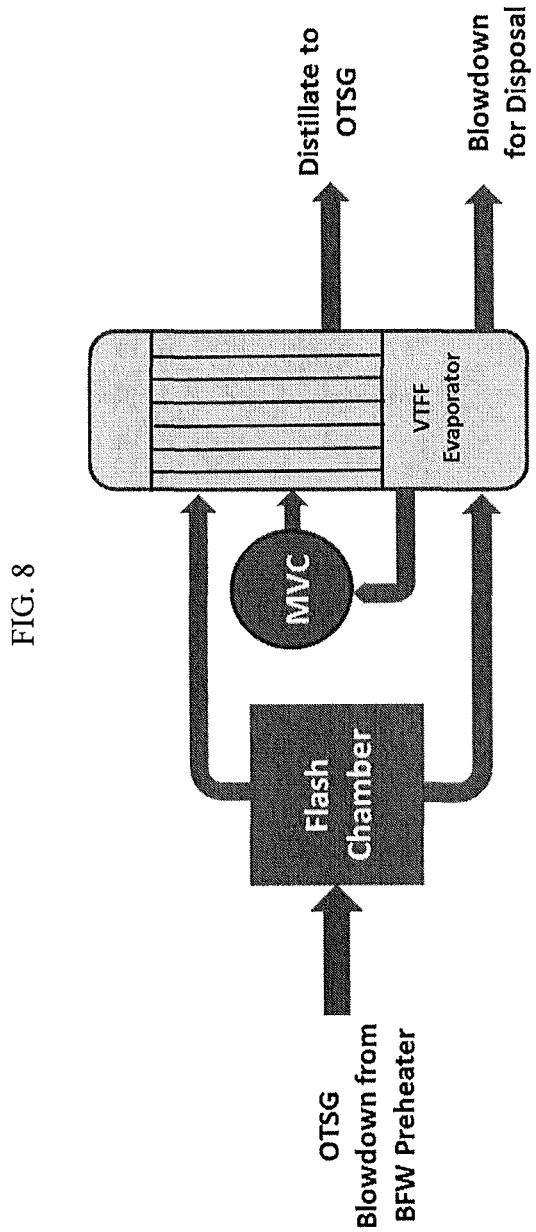
FIG. 8: OTSG blowdown recovery system utilizing the inventors' Once-Through Flash Evaporation technology. The blowdown stream leaving the OTSG is partially cooled by the boiler feed water preheater and fed directly to the inventor's evaporation system at a temperature of 155° C. The ability of the Once-Through Flash Evaporator to accept this temperature eliminates the need for additional cooling steps upstream of the evaporator, such as a trim cooler.

In a further embodiment the evaporation system includes a 1) flash drum; 2) primary evaporator; and 3) vapor condenser. (Refer to FIG. 8.) An OTSG Blowdown stream has a flow rate of 200 m3/h. We compare how this would be treated by the conventional evaporator technology and the inventor's technology.

Figure 7:
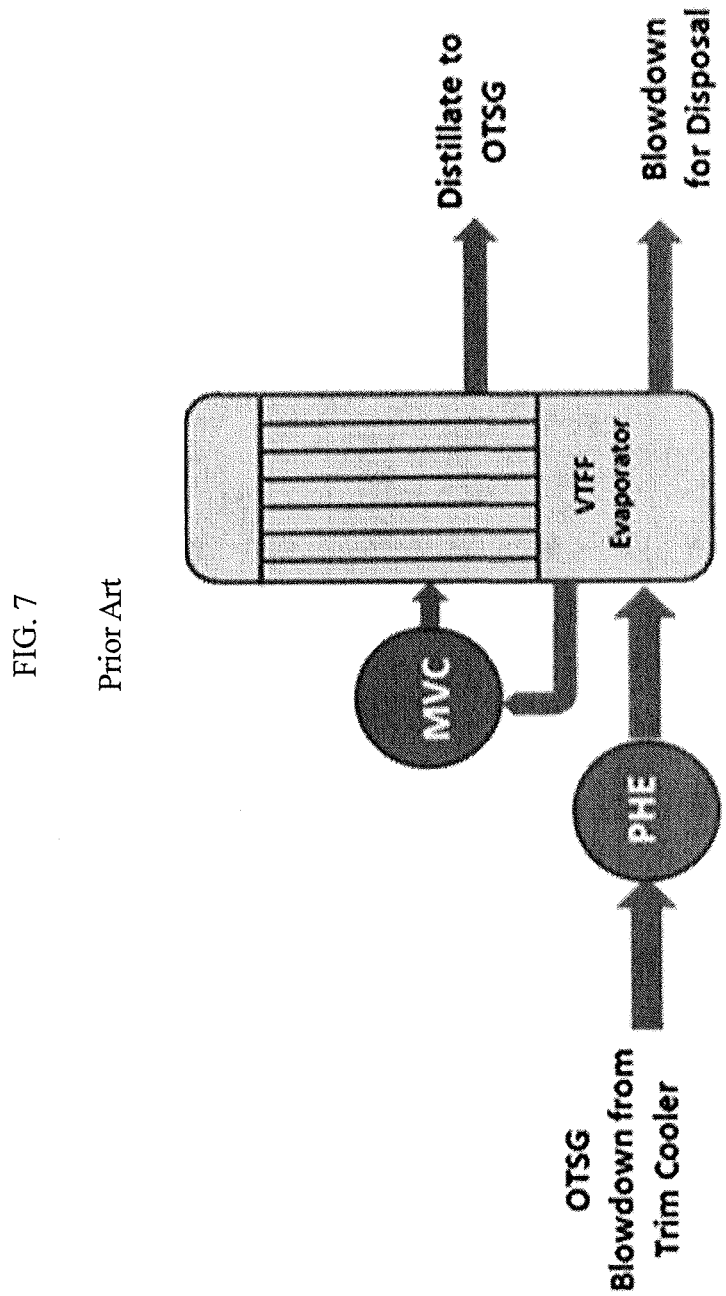
FIG. 7: OTSG blowdown recovery system utilizing conventional evaporation technology. The blowdown stream leaving the OTSG is cooled by multiple cooler's to produce a liquid stream existing at 90° C. that is preheated in the preheater (PHE) and fed to the conventional evaporator.

In this example, the OTSG blowdown stream is to be recovered with a VTFF evaporator that is designed to operate at 20 cycles of concentration for a water recovery of 95%. We then would have an evaporator system mass balance as:
OTSG Blowdown: 200 m³/h
Distillate: 190 m³/h
Evaporator Blowdown: 10 m³/h First consider the conventional evaporator technology. The OTSG blowdown is sent through the BFW preheater and then the trim cooler to deliver the stream to the evaporator at 90° C. (Refer to FIG. 7.) Considering a specific energy requirement for the MVC design of 15 kW·hr/m³ of distillate, the operating power requirement for such a system would calculated as be as follows:

(190 m³/h)*(15 kW·h/m³)*(8,760 h/y)=25,000 MW/year

Considering a cost of power of $0.08/kW, the annual OPEX for this system would be $2.0 Million/year.

Next, consider the new evaporator technology reported herein. In this design, the OTSG blowdown leaves the BFW preheater at a temperature of 155° C. at a flow of 200 m³/h and is fed to the evaporator flash vessel. Approximately 19 m³/h of liquid is converted to vapor in the flash vessel. This vapor stream flows to the evaporator shell where it condenses, transferring its latent heat to the evaporator brine and produces evaporation.

Consider two important benefits realized by the inventive evaporator design. First, the water that is vaporized in the flash drum does not need to be evaporated in the downstream evaporators and, more specifically, does not require compression with a mechanical vapor compressor. And second, the water vapor generated by the flash vessel is used to drive evaporation in the evaporator. This further reduces the amount of flow that requires compression with the mechanical vapor compressor. This vapor can be recovered by condensation without compression. (Refer to FIG. 5.)

Consider these two benefits. For point #1, of the initial 190 m³/h that needs to be recovered, 19 m³/h has already been recovered in the initial flash vessel. This leaves only 171 m³/h left to recover, and the evaporation duty is reduced by 10%. Considering point #2, the flashed stream does not need to be compressed and can flow immediately to the evaporator shell for evaporation. This reduces the compression duty by an additional 10% for a net decrease of 20% in terms of compression work. Revised flow for compression now becomes:

190 m³/h–19 m³/h–19 m³/h=152 m³/h (152 m³/h)*(15 kW·h/m³)*(8,760 h/year)=20,000 MW/year Considering a cost of power of $0.08/kW, the annual OPEX for this system would be $1.6 Million/year.

This example shows that by applying the evaporation technology reported herein, the power consumption can be reduced by 20% or more. In this example, the use of this technology results in an annual savings of $400,000/year.

Those of skill in the art will, with the benefit of this disclosure, recognize that certain variations and additions to the described technology may be made. This variations and additions should be considered within the scope and spirit of this disclosure.

We claim:

1. A method of water recovery from once-through steam generator ("OTSG") blowdown water, comprising:
    a) providing a water stream;
    b) feeding the water stream to a once-through steam generator as feed water ("OTSG Feed") and producing steam;
    c) blowing down a fraction of the OTSG feed water not used to produce steam ("OTSG BD") to a flash chamber;
    d) flashing a fraction of the OTSG BD stream to produce a vapor phase and a liquid phase in the flash chamber;
    e) flowing the vapor phase directly from the flash chamber to an evaporator, where the vapor phase transfers latent heat to the evaporator and condenses to form condensate, and wherein the evaporator produces distillate;
    f) flowing the liquid phase separately from the vapor phase from the flash chamber to the evaporator, thereby concentrating the dissolved solids in the water and producing a more highly concentrated blowdown liquid stream;
    g) blowing down the subsequent concentrated liquid phase from the evaporator; and
    h) recycling the distillate as OTSG feedwater.

2. The method of claim 1, wherein the water stream is produced water from heavy oil production.

3. The method of claim 2, further comprising, prior to feeding the water stream to the once-through steam generator as feed water, treating the water stream with a process selected from the group consisting of warm lime softening, cold lime softening, hot lime softening, magnesium oxide dosing, soda ash dosing, evaporation, membrane separation, and ion exchange.

4. The method of claim 1, further comprising cooling the OTSG BD prior to blowing it down to the flash chamber.

5. The method of claim 1, further supplementing the water stream by addition of at least one member of the group consisting of make-up water, wastewater, and a partial recycle of OTSG blowdown.

6. The method of claim 1, further comprising processing a remaining liquid phase of the OTSG blowdown stream through at least one additional preconditioning step upstream of the evaporator.

7. The method of claim 6, where the at least one additional preconditioning step comprises ion exchange treatment to a hardness level of less than 0.5 mg/L.

8. The method of claim 6, wherein said at least one conditioning step comprises deaeration.

9. The method of claim 1, wherein the evaporator is a single-effect evaporator.

10. The method of claim 1, wherein the evaporator is a plurality of evaporators.

11. The method of claim 10, where the plurality of evaporators are arranged in a multiple-effect configuration, wherein a vapor generated by one effect is used to drive evaporation in a subsequent effect.

12. The method of claim 11, wherein the vapor generated by each effect is sufficient to drive 100% of the required evaporation in each subsequent evaporator, such that MVC is not required.

13. The method of claim 1, comprising sending the vapor phase of the OTSG blowdown to one or more evaporators to drive evaporation.

14. The method of claim 1, comprising disposing of evaporator blowdown by deep-well disposal.

15. The method of claim 1, further comprising processing the evaporator blowdown in at least one of a further evaporator and a crystallizer to achieve zero-liquid-discharge.

16. The method of claim 1, comprising recovering the distillate and condensate streams and recycling them upstream of the OTSG.

17. The method of claim 1, comprising condensing vaporized water from the evaporator to produce distillate that is also recycled upstream of the OTSG.

18. The method of claim 1, in which the vapor phase generated at the flash chamber is used as motive steam to a thermocompressor to efficiently entrain lower pressure water vapor for beneficial use.

19. The method of claim 18, wherein the beneficial use is to drive evaporation by flowing the thermocompressor discharge water vapor to an evaporator.

20. The method of claim 1, comprising concentrating the liquid phase leaving the flash chamber by a reverse osmosis membrane.

21. The method of claim 20, comprising further processing the reverse osmosis reject stream by the evaporator.

22. The method of claim 21, comprising processing the reverse osmosis reject stream in a zero-liquid discharge system.

23. A method of water recovery from once-through steam generator ("OTSG") blowdown water for heavy oil production, comprising:
   a) providing a produced water stream extracted from a heavy oil production well;
   b) deoiling said produced water stream to provide a deoiled water stream;
   c) feeding the deoiled water stream to a once-through steam generator as feed water (OTSG Feed) and producing steam;
   d) injecting the steam produced by the once-through steam generator into a heavy oil injection well;
   e) blowing down a fraction of the OTSG feed water to a flash chamber;
   f) flashing a fraction of the blown-down fraction of the OTSG feed water to produce a vapor phase and a liquid phase;
   g) flowing the vapor phase directly from the flash chamber to an evaporator where the vapor transfers latent heat to the evaporator and condenses to form condensate;
   h) feeding the said liquid phase separately from the vapor phase to the evaporator where a fraction of the blown-down fraction of the OTSG feed water is evaporated, causing a remaining OTSG blowdown liquid phase to be more highly concentrated;
   i) blowing down the more highly concentrated OTSG BD liquid phase from the evaporator for disposal; and
   j) recycling recovered water to the process upstream of the OTSG, either to the produced water or deoiled water.

\* \* \* \* \*